(12) United States Patent
Wang et al.

(10) Patent No.: US 7,558,062 B2
(45) Date of Patent: Jul. 7, 2009

(54) HEAT-DISSIPATING MODULE AND ELECTRONIC APPARATUS

(75) Inventors: Feng-Ku Wang, Taipei (TW); Yi-Lun Cheng, Taipei (TW); Chun-Lung Lin, Taipei (TW); Chih-Kai Yang, Taipei (TW); Cheng-Shi Liu, Taipei (TW)

(73) Assignee: Inventec Corporation, Taipei (TW)

( * ) Notice: Subject to any disclaimer, the term of this patent is extended or adjusted under 35 U.S.C. 154(b) by 0 days.

(21) Appl. No.: 11/850,500

(22) Filed: Sep. 5, 2007

(65) Prior Publication Data

US 2009/0016020 A1    Jan. 15, 2009

(30) Foreign Application Priority Data

Jul. 13, 2007    (TW) ............... 96125619 A (51) Int. Cl.
*H05K 7/20* (2006.01)
*F28F 7/00* (2006.01)

(52) U.S. Cl. ............... 361/695; 165/80.2; 165/80.3; 165/185; 361/610; 361/694; 361/679.48; 361/679.54

(58) Field of Classification Search ......... 361/610, 361/695, 686
See application file for complete search history.

(56) References Cited

U.S. PATENT DOCUMENTS

| | | | | |
|---|---|---|---|---|
| 3,149,666 A | * | 9/1964 | Coe | 165/121 |
| 4,695,924 A | * | 9/1987 | Wozniczka | 361/720 |
| 4,972,294 A | * | 11/1990 | Moses, Jr. et al. | 361/704 |
| 5,588,483 A | * | 12/1996 | Ishida | 165/86 |
| 5,946,188 A | * | 8/1999 | Rochel et al. | 361/690 |
| 6,137,683 A | * | 10/2000 | Lee et al. | 361/704 |
| 6,233,146 B1 | * | 5/2001 | Gilchrist et al. | 361/687 |
| 6,377,455 B1 | * | 4/2002 | Nelik | 361/687 |
| 6,920,044 B2 | * | 7/2005 | Lin | 361/697 |
| 6,987,669 B2 | * | 1/2006 | Chen | 361/695 |
| 7,148,452 B2 | * | 12/2006 | Peterson et al. | 219/443.1 |
| 2008/0186675 A1 | * | 8/2008 | Wang et al. | 361/695 |

* cited by examiner

*Primary Examiner*—Gregory D Thompson
(74) *Attorney, Agent, or Firm*—J.C. Patents (57) ABSTRACT

A heat-dissipating module suitable for dissipating heat generated by a heat-generating element is provided. The heat-dissipating module includes a first heat-conducting plate, a first heat-dissipating tube, and a fan. The first heat-conducting plate is thermally coupled to the heat-generating element. The first heat-dissipating tube has a first opening and a second opening opposite to the first opening. The first heat-conducting plate is connected to the first heat-dissipating tube and located at an outside of the first heat-dissipating tube. The fan is disposed adjacent to the first opening and corresponding to first opening. The fan is adapted for generating an air current flowing in the first heat-dissipating tube. The heat-dissipating module can transfer the heat generated by the heat-generating element during operation to an external environment.

18 Claims, 7 Drawing Sheets

HEAT-DISSIPATING MODULE AND ELECTRONIC APPARATUS

CROSS-REFERENCE TO RELATED APPLICATION

This application claims the priority benefit of Taiwan application Ser. No. 96125619, filed on Jul. 13, 2007. All disclosure of the Taiwan application is incorporated herein by reference.

BACKGROUND OF THE INVENTION

1. Field of the Invention

The present invention relates to a heat-dissipating module and an electronic apparatus, and more particularly to a heat-dissipating module having a heat-dissipating tube and an electronic apparatus having the heat-dissipating module.

2. Description of Related Art

With rapid advance of computer technology in recent years, computers are made to operate at high frequency, and a heat generation rate of each of electronic elements in a computer host has become greater and greater. To avoid temporary or permanent failures of the electronic elements in the computer host due to overheat, dissipating the heat generated by the electronic elements in the computer host is of critical importance.

Taking a central processing unit (CPU) as an example, when the temperature of the CPU itself exceeds its normal operating temperature during operation at high frequency, operation errors or temporary failures of the CPU will probably occur, resulting in a crash of the computer. In addition, when the temperature of the CPU itself is much higher than its normal operating temperature, transistors in the CPU will be probably damaged, causing the permanent failure of the CPU.

Taking a notebook computer as another example, a general trend of the current notebook computers is towards the development of large data storage capacity, high reading speed and high writing speed. In line with this trend, current hard disks are developed towards high memory capacity and a high rotation rate.

However, the development of the hard disks as described above will cause a considerable amount of heat generated by the hard disks during operation, thereby increasing the temperatures of the hard disks during operation. If the heat is not timely transferred and thus is accumulated in the hard disks, the temperatures of the hard disks will continuously rise and exceed over their normal operating temperatures. This overheating may result in temporary or permanent failures of the hard disks or a shortened life span thereof. The temporary failures of the hard disks will cause a data loss or the crash of the notebook computer due to its unstable operation. In addition, if the temperatures of the hard disks are much higher than their operating temperatures, the hard disks may be subject to unrecoverable damage.

SUMMARY OF THE INVENTION

The present invention is directed to a heat-dissipating module with improved heat-dissipating efficiency.

The present invention is also directed to an electronic apparatus that includes a heat-dissipating module with improved heat-dissipating efficiency.

The present invention provides a heat-dissipating module adapted for cooling a heat-generating element. The heat-dissipating module includes a first heat-conducting plate, a first heat-dissipating tube, and a fan. The first heat-conducting plate is thermally coupled to the heat-generating element. The first heat-dissipating tube has a first opening and a second opening opposite to the first opening. The first heat-conducting plate is connected to the first heat-dissipating tube and located at an outside of the first heat-dissipating tube. The fan is located adjacent to the first opening and corresponding to the first opening. Besides, the fan is adapted to generate an air current flowing in the first heat-dissipating tube.

According to one embodiment of the present invention, the first heat-dissipating tube is reel-shaped.

According to one embodiment of the present invention, the first heat-dissipating tube includes an uneven tube wall.

According to one embodiment of the present invention, the first heat-dissipating tube includes a tube wall and a plurality of heat-dissipating fins disposed on the tube wall and located within the first heat-dissipating tube.

According to one embodiment of the present invention, the heat-dissipating module further includes a second heat-conducting plate thermally coupled to the heat-generating element. The second heat-conducting plate is connected to the first heat-conducting plate at an angle, and the fan is located at the second heat-conducting plate. In addition, the fan may pass through the second heat-conducting plate. Furthermore, the fan may pass through the second heat-conducting plate and may be fixed to the second heat-conducting plate with two fixing members.

According to one embodiment of the present invention, the heat-dissipating module further includes a second heat-dissipating tube having a third opening and a fourth opening opposite to the third opening. The first heat-conducting plate is connected to the second heat-dissipating tube and located at an outside of the second heat-dissipating tube, and the third opening is located adjacent to the second opening and corresponding to the second opening. In addition, the shape of the second heat-dissipating tube may be the same as the shape of the first heat-dissipating tube.

The present invention provides an electronic apparatus including a housing, a heat-generating element located within the housing, and a heat-dissipating module located within the housing. The heat-dissipating module includes a first heat-conducting plate, a first heat-dissipating tube, and a fan. The first heat-conducting plate is thermally coupled to the heat-generating element. The first heat-dissipating tube has a first opening and a second opening opposite to the first opening. The first heat-conducting plate is connected to the first heat-dissipating tube and located at an outside of the first heat-dissipating tube. The fan is located adjacent to the first opening and corresponding to the first opening. Besides, the fan is adapted to generate an air current flowing in the first heat-dissipating tube.

According to one embodiment of the present invention, the first heat-conducting plate may be adapted to rotate around a rotation axis from a first position in which the heat-conducting plate in the housing covers the heat-generating element to a second position outside the housing. In addition, the rotation axis passes through the first opening and the second opening. Furthermore, the heat-dissipating module further includes a second heat-conducting plate thermally coupled to the heat-generating element. The second heat-conducting plate is connected to the first heat-conducting plate at an angle, and the fan is located at the second heat-conducting plate. Moreover, the fan may pass through the second heat-conducting plate and may be fixed within the housing, and the first heat-conducting tube may rotate relatively to the fan. Alternatively, the fan may pass through the second heat-conducting plate and may be fixed to the second heat-conducting plate with two fixing members. The fixing members are located on different sides of the fan and are slidingly disposed in two arc-shaped rails of the housing, respectively, and the first heat-dissipating tube and the fan are adapted to rotate relatively to the housing.

According to one embodiment of the present invention, the first heat-dissipating tube is reel-shaped.

According to one embodiment of the present invention, the first heat-dissipating tube includes an uneven tube wall.

According to one embodiment of the present invention, the first heat-dissipating tube includes a tube wall and a plurality of heat-dissipating fins disposed on the tube wall and located within the first heat-dissipating tube.

According to one embodiment of the present invention, the heat-dissipating module further includes a second heat-dissipating tube having a third opening and a fourth opening opposite to the third opening. The first heat-conducting plate is connected to the second heat-dissipating tube and located at an outside of the second heat-dissipating tube, and the third opening is located adjacent to the second opening and corresponding to the second opening. In addition, the shape of the second heat-dissipating tube may be the same as the shape of the first heat-dissipating tube.

Since the heat-dissipating module includes the heat-dissipating tube and the fan, the heat-conducting plate can transfer the heat to the heat-dissipating tube and the air current flowing in the heat-dissipating tube can transfer the heat to an external environment when the heat-generating element operates and generates the heat. Therefore, with the heat dissipation of the heat-dissipating module, the heat-generating element can operate within a predetermined operating temperature scope. In addition, the heat-dissipating tube has a tubular shape, and thus the air current flowing in the heat-dissipating tube can perform a heat exchange with high efficiency. Furthermore, the heat-conducting plate connected with the heat-dissipating tubes may rotate from the first position in which the heat-conducting plate in the housing covers the heat-generating element to the second position outside the housing. Thus, the heat-generating element can be easily replaced if necessary.

In order to make the aforementioned and other features and advantages of the present invention more comprehensible, embodiments accompanied with figures are described in detail below.

DESCRIPTION OF THE EMBODIMENTS

First Embodiment

Figure 1:
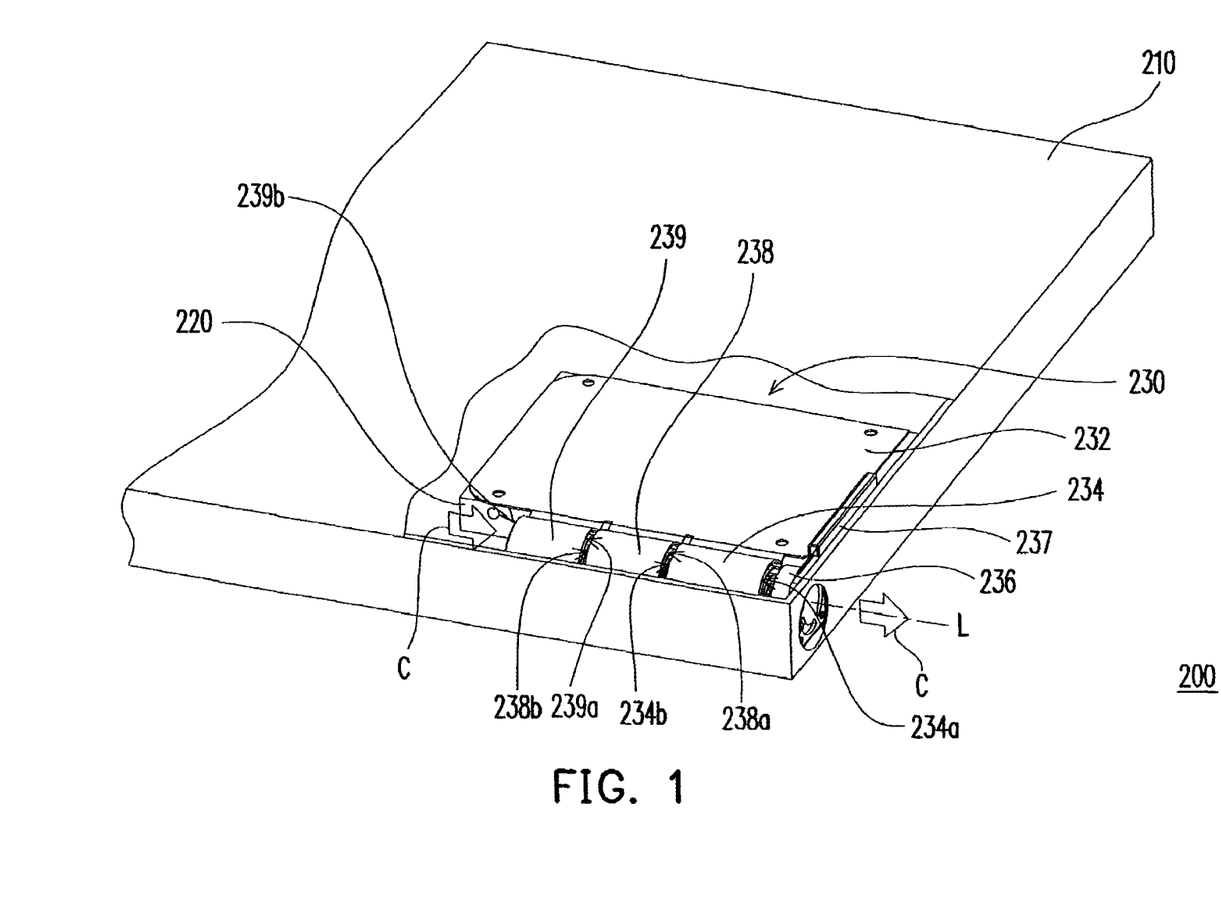
FIG. 1 is a schematic perspective view of an electronic apparatus in accordance with a first embodiment of the present invention.
Figure 2:
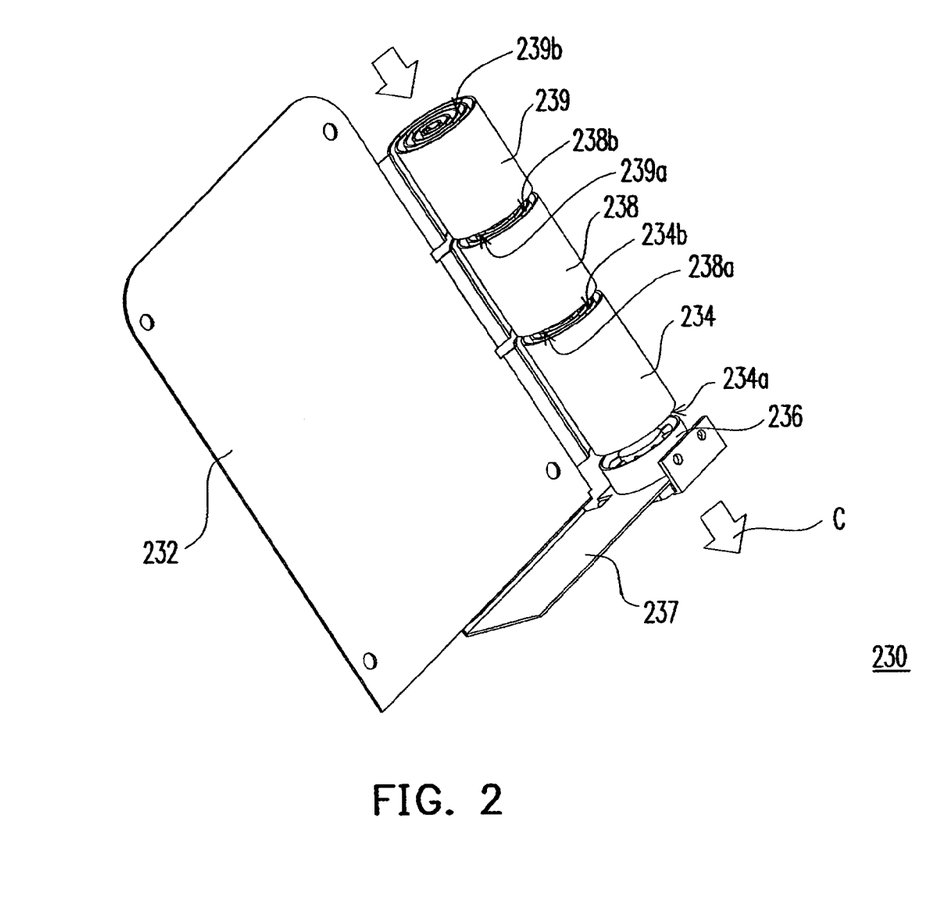
FIG. 2 is a schematic perspective view of the heat-dissipating module of FIG. 1.

FIG. 1 is a schematic perspective view of an electronic apparatus in accordance with a first embodiment of the present invention, and FIG. 2 is a schematic perspective view of the heat-dissipating module of FIG. 1. Note that a cutaway view of part of an electronic apparatus 200 is illustrated in FIG. 1 for convenient illustration. Referring to FIGS. 1 and 2, the electronic apparatus 200 (e.g., a notebook computer) of this embodiment includes a housing 210, a heat-generating element 220 (e.g., a hard disk) located within the housing 210, and a heat-dissipating module 230.

The heat-dissipating module 230 is disposed within the housing 210 and includes a heat-conducting plate 232, a heat-dissipating tube 234, and a fan 236. The heat-conducting plate 232 is thermally coupled to the heat-generating element 220. The heat-dissipating tube 234 has an opening 234a and another opening 234b opposite to the opening 234a. The heat-conducting plate 232 is connected to the heat-dissipating tube 234 and is located at an outside of the heat-dissipating tube 234. The fan 236 is positioned adjacent to the opening 234a and corresponding to the opening 234a. The fan 236 is adapted to generate an air current C flowing in the heat-dissipating tube 234.

Since the heat-dissipating module 230 includes the heat-dissipating tube 234 and the fan 236, the heat-conducting plate 232 can transfer the heat to the heat-dissipating tube 234 and the air current C flowing in the heat-dissipating tube 234 can transfer the heat to an external environment when the heat-generating element 220 operates and generates the heat. Therefore, with the heat dissipation of the heat-dissipating module 230, the heat-generating element 220 can operate within a predetermined operating temperature scope. In addition, the heat-dissipating tube 234 has a tubular shape, and thus the air current C flowing in the heat-dissipating tube 234 can perform a heat exchange with high efficiency.

In this embodiment, the heat-dissipating module 230 further includes a heat-conducting plate 237, a heat-dissipating tube 238, and another heat-dissipating tube 239. The heat-conducting plate 237 is thermally coupled to the heat-generating element 220. The heat-conducting plate 237 is connected to the heat-conducting plate 232 at an angle, and the fan 236 is located at the heat-conducting plate 237. Specifically, the heat-conducting plate 232 and the heat-conducting plate 237 may be formed integrally, and the heat-conducting plate 237 is bent with respect to the heat-conducting plate 232. In addition, the fan 236 of this embodiment may pass through the heat-conducting plate 237 and may be fixed within the housing 210 These heat-dissipating tubes 234, 238, and 239 are adapted to rotate relatively to the fan 236 (as described below in detail).

The heat-dissipating tube 238 has an opening 238a and another opening 238b opposite to the opening 238a. The heat-dissipating tube 239 has an opening 239a and another opening 239b opposite to the opening 239a. The heat-conducting plate 232 is connected to the heat-dissipating tubes 238 and 239 and located at an outside of the heat-dissipating tubes 238 and 239. The opening 238a is positioned adjacent to the opening 234b and corresponding to the opening 234b. The opening 239a is positioned adjacent to the opening 238b and corresponding to the opening 238b. It should be understood that the number of the heat-dissipating tubes may vary with various design requirements, and this embodiment is described as an example and should not be regarded as a limitation on the present invention.

Figure 3A:
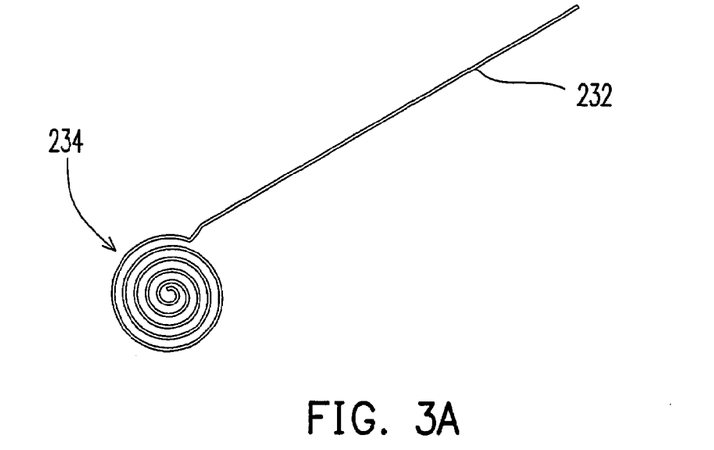
FIG. 3A is a schematic cross-sectional view of the heat-dissipating tube and the heat-conducting plate of FIG. 2.

FIG. 3A is a schematic cross-sectional view of the heat-dissipating tube and the heat-conducting plate of FIG. 2. Referring to FIGS. 2 and 3A, the heat-dissipating tube 238 and the heat-dissipating tube 239 may have the same shape as the heat-dissipating tube 234 does. Further, the heat-dissipating tubes 234, 238 and 239 may be reel-shaped. That is to say, as shown in the cross-section of FIG. 3A, these heat-dissipating tubes 234, 238 and 239 may have a helical shape. In this embodiment, the heat-conducting plate 232 may be formed integrally together with these heat-dissipating tubes 234, 238, and 239.

Figure 3B:
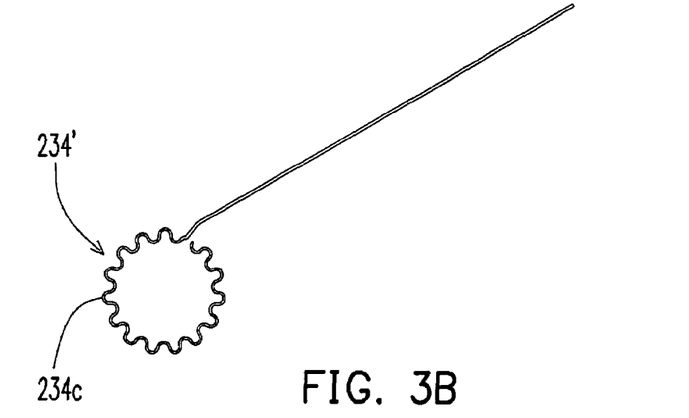
FIG. 3B is a schematic cross-sectional view illustrating another shape of the heat-dissipating tube according to the first embodiment.
Figure 3C:
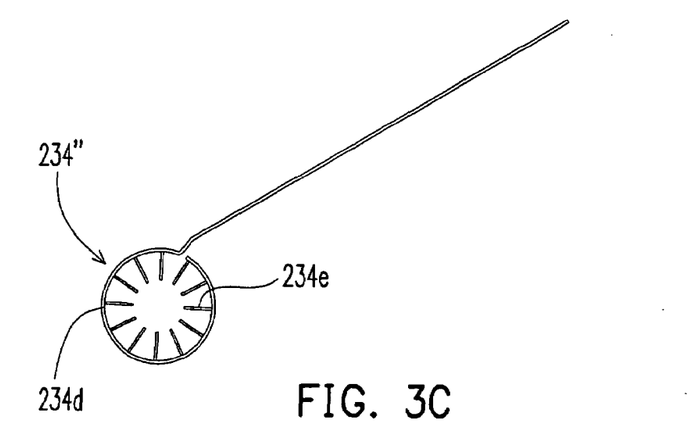
FIG. 3C is a schematic cross-sectional view illustrating still another shape of the heat-dissipating tube according to the first embodiment.

However, the shape of the heat-dissipating tubes 234, 238, and 239 may vary according to various design requirements. FIG. 3B is a schematic cross-sectional view illustrating another shape of the heat-dissipating tube according to the first embodiment, and FIG. 3C is a schematic cross-sectional view illustrating still another shape of the heat-dissipating tube according to the first embodiment. Referring to FIG. 3B, a heat-dissipating tube 234' includes a tube wall 234c that may be uneven. In addition, referring to FIG. 3C, a heat-dissipating tube 234" includes a tube wall 234d and a plurality of heat-dissipating fins 234e. The heat-dissipating fins 234e are disposed on the tube wall 234d and within the heat-dissipating tube 234". It should be appreciated that the heat-dissipating tube 234" does not occupy an extra space in the housing 210 because the heat-dissipating fins 234e are disposed within the heat-dissipating tube 234".

Figure 4A:
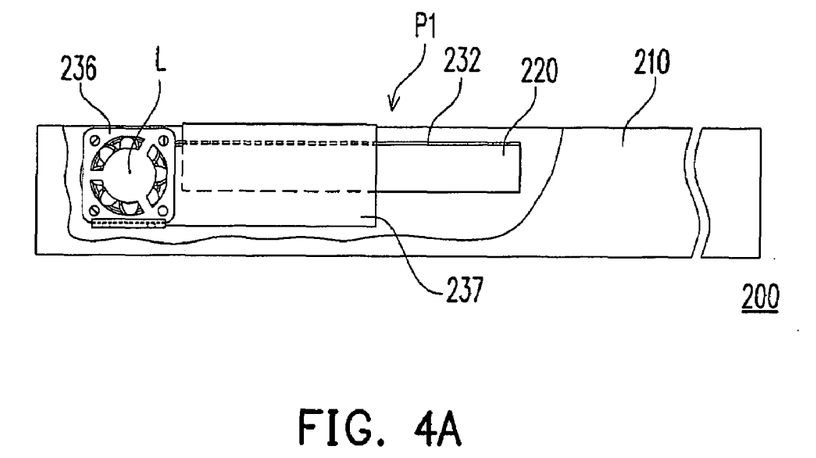
FIG. 4A is a schematic side view showing the heat-conducting plate of the electronic apparatus in a first position.
Figure 4B:
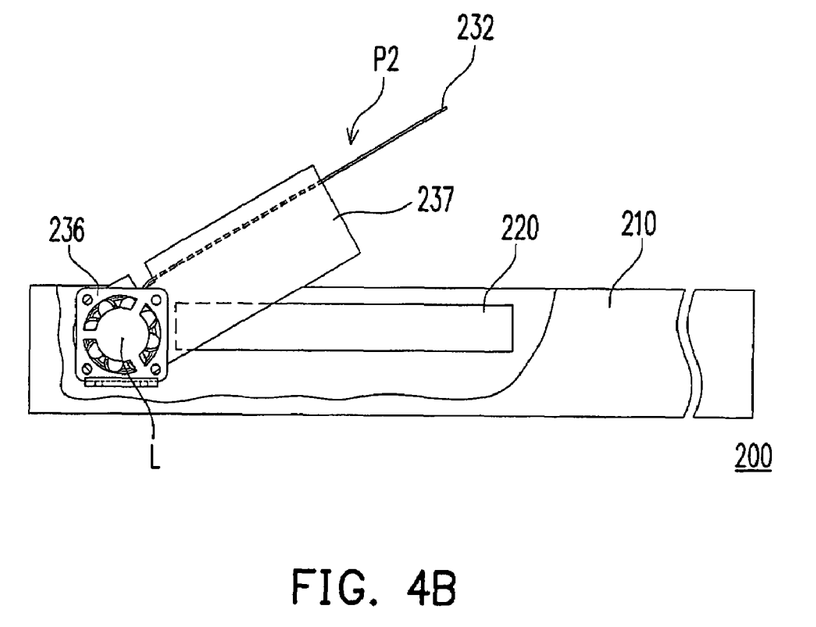
FIG. 4B is a schematic side view showing the heat-conducting plate of the electronic apparatus in a second position.

FIG. 4A is a schematic side view showing the heat-conducting plate of the electronic apparatus in a first position, and FIG. 4B is a schematic side view showing the heat-conducting plate of the electronic apparatus in a second position. Note that the cutaway views of part of the electronic apparatus 200 are described in FIGS. 4A and 4B for convenient illustration. Referring to FIGS. 4A and 4B, in this embodiment, the heat-conducting plate 232 is adapted to rotate around a rotation axis L (see FIG. 1) from a first position P1 in which the heat-conducting plate 232 within the housing 210 covers the heat-generating element 220 to a second position P2 outside the housing 210. Specifically, in this embodiment, the heat-conducting plate 237 may rotate relatively to the fan 236, so that when the heat-conducting plate 232 is turned by a user, the heat-dissipating tubes 234, 238, and 239 (see FIG. 1) connected to the heat-conducting plate 232 may also rotate relatively to the fan 236. In this embodiment, the rotation axis L passes through the openings 234a, 234b, 238a, 238b, 239a and 239b.

The heat-conducting plate 232 connected with the heat-dissipating tubes 234, 238, and 239 may rotate from the first position P1 in which the heat-conducting plate 232 within the housing 210 covers the heat-generating element 220 to the second position P2 outside the housing 210, and thus the heat-generating element 220 can be easily replaced if necessary.

Second Embodiment

Figure 5A:
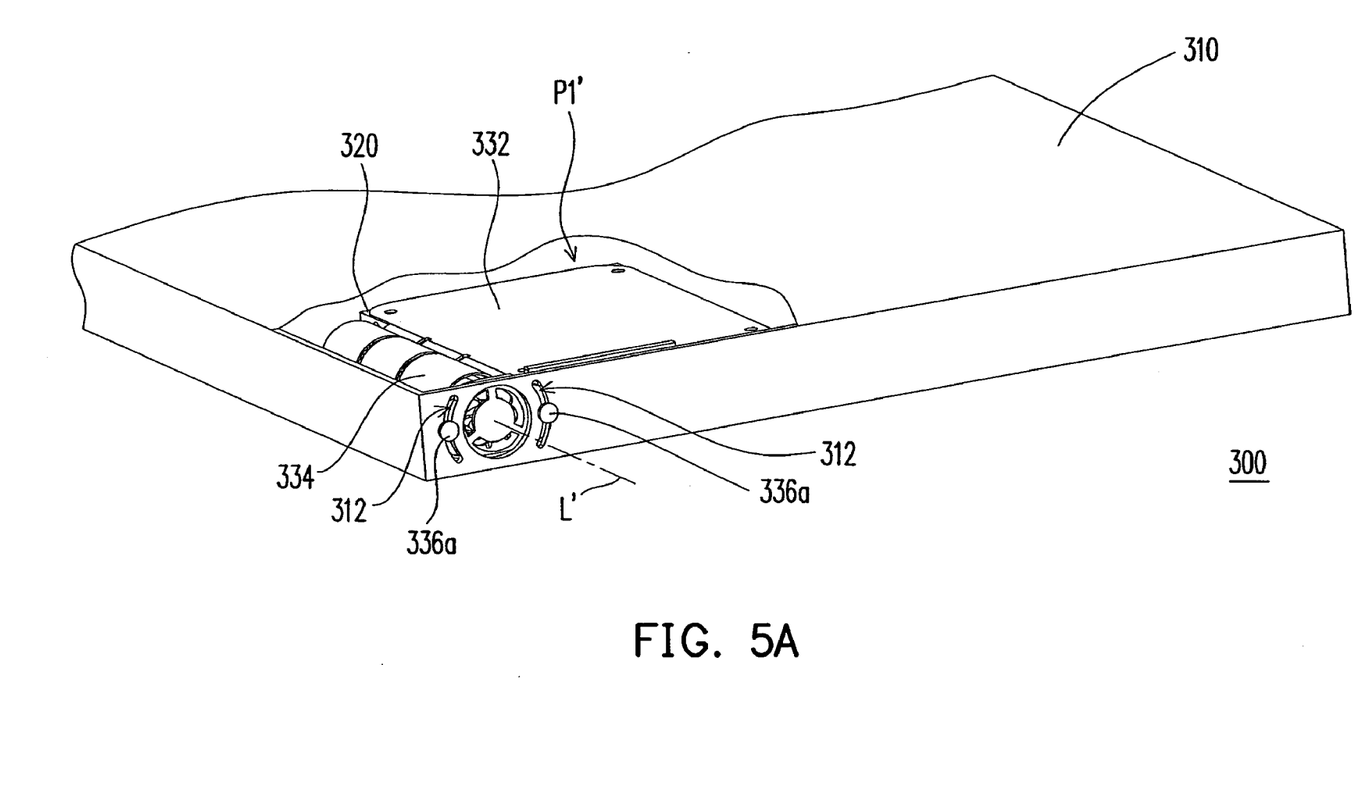
FIG. 5A is a schematic perspective view showing a heat-conducting plate of an electronic apparatus in a first position in accordance with a second embodiment of the present invention.
Figure 5B:
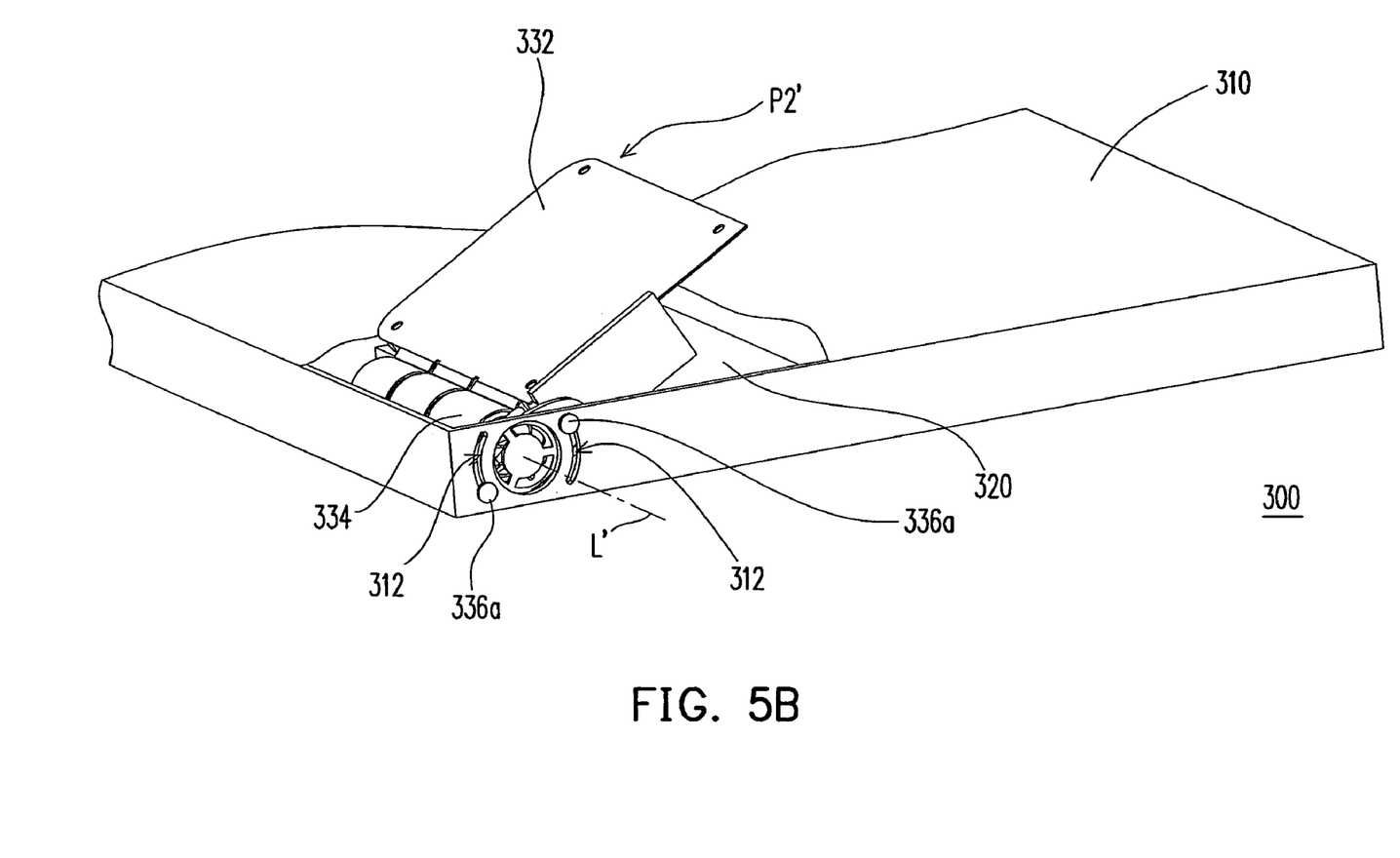
FIG. 5B is a schematic perspective view showing the heat-conducting plate of the electronic apparatus in a second position in accordance with the second embodiment of the present invention.

FIG. 5A is a schematic perspective view showing a heat-conducting plate of an electronic apparatus in a first position in accordance with a second embodiment of the present invention, and FIG. 5B is a schematic perspective view showing the heat-conducting plate of the electronic apparatus in a second position in accordance with the second embodiment of the present invention. Referring to FIGS. 5A and 5B, in this embodiment, a heat-conducting plate 332 is adapted to rotate around a rotation axis L' (see FIG. 1) from a first position P1' in which the heat-conducting plate 332 within a housing 310 of an electronic apparatus 300 covers a heat-generating element 320 to a second position P2' outside the housing 310.

Figure 6:
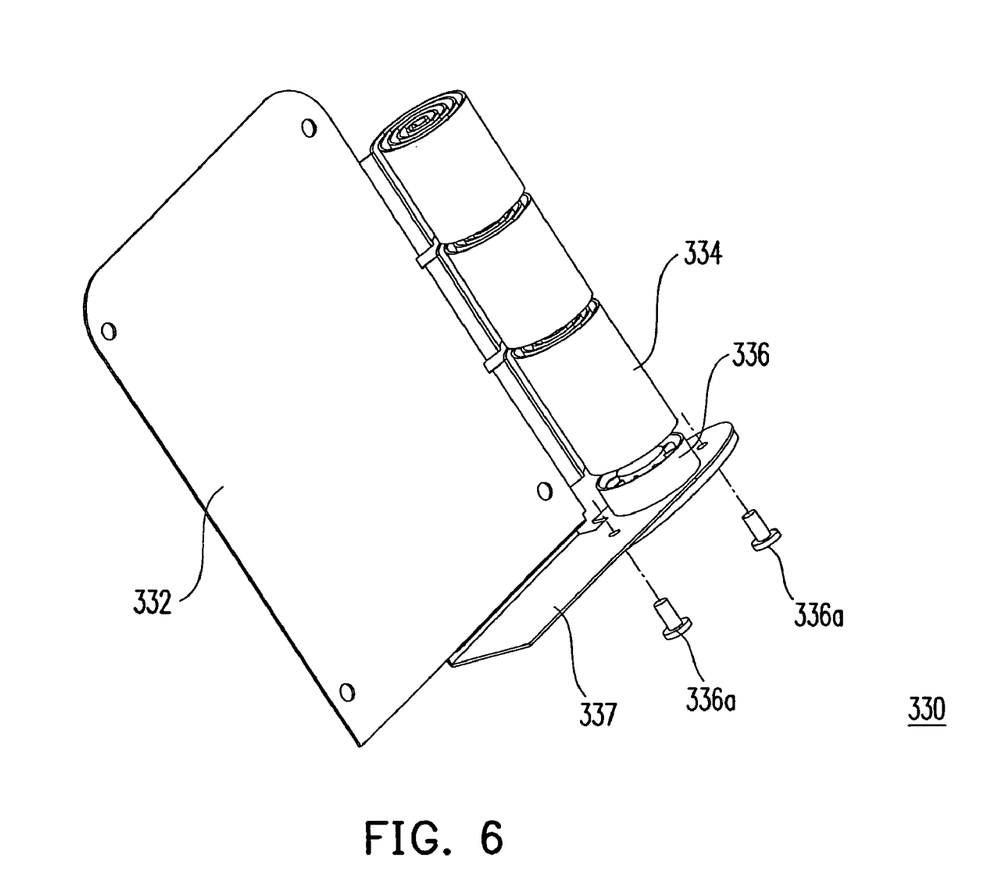
FIG. 6 is a schematic perspective view of a heat-dissipating module in accordance with the second embodiment.

FIG. 6 is a schematic perspective view of a heat-dissipating module of the second embodiment. Referring to FIGS. 5A and 6, the electronic apparatus 300 of the second embodiment is different from the electronic apparatus 200 of the first embodiment, and the main difference lies in that the heat-dissipating module 300 includes a fan 336 that may be fixed to a heat-conducting plate 337 by using two fixing members 336a. The fixing members 336a are located on different sides of the fan 336 and are slindingly disposed in two arc-shaped rails 312 of the housing 310, respectively. A heat-dissipating tube 334 and the fan 336 are adapted to rotate relatively to the housing 310.

In sum, the heat-dissipating module and the electronic apparatus of the present invention have at least the following advantages:

1. Since the heat-dissipating module includes the heat-dissipating tube and the fan, the heat-conducting plate can transfer the heat to the heat-dissipating tube and the air current flowing in the heat-dissipating tube can transfer the heat to the external environment when the heat-generating element operates and generates the heat. Therefore, with the heat dissipation of the heat-dissipating module, the heat-generating element can operate within a predetermined operating temperature scope.

2. The heat-dissipating tube has a tubular shape, and thus the air current flowing in the heat-dissipating tube can perform the heat exchange with high efficiency.

3. The heat-conducting plate connected with the heat-dissipating tubes may rotate from the first position in which the heat-conducting plate within the housing covers the heat-generating element to the second position outside the housing, and thus the heat-generating element can be easily replaced if necessary.

It will be apparent to those skilled in the art that various modifications and variations can be made to the structure of the present invention without departing from the scope or the spirit of the invention. In view of the foregoing, it is intended that the present invention cover modifications and variations of this invention provided they fall within the scope of the following claims and their equivalents.

What is claimed is:

1. A heat-dissipating module adapted for cooling a heat-generating element, the heat-dissipating module comprising:
   a first heat-conducting plate thermally coupled to the heat-generating element;
   a first heat-dissipating tube having a first opening and a second opening opposite to the first opening, wherein the first heat-conducting plate is connected to the first heat-dissipating tube and located at an outside of the first heat-dissipating tube;
   a second heat-conducting plate, thermally coupled to the heat-generating element, wherein the second heat-conducting plate is connected to the first heat-conducting plate at an angle; and
   a fan located at the second heat-conducting plate and adjacent and corresponding to the first opening, wherein the fan is adapted to generate an air current flowing in the first heat-dissipating tube.

2. The heat-dissipating module in accordance with claim 1, wherein the first heat-dissipating tube is reel-shaped.

3. The heat-dissipating module in accordance with claim 1, wherein the first heat-dissipating tube includes an uneven tube wall.

4. The heat-dissipating module in accordance with claim 1, wherein the first heat-dissipating tube includes a tube wall and a plurality of heat-dissipating fins disposed on the tube wall and located within the first heat-dissipating tube.

5. The heat-dissipating module in accordance with claim 1, wherein the second heat-conducting plate has a fifth opening, and the fan passes through the second heat-conducting plate by the fifth opening of the second heat-conducting plate.

6. The heat-dissipating module in accordance with claim 5, wherein the fan passes through the second heat-conducting plate by the fifth opening of the second heat-conducting plate and is fixed to the second heat-conducting plate with two fixing members.

7. The heat-dissipating module in accordance with claim 1, further comprising a second heat-dissipating tube having a third opening and a fourth opening opposite to the third opening, wherein the first heat-conducting plate is connected to the second heat-dissipating tube and located at an outside of the second heat-dissipating tube, and the third opening is located adjacent to the second opening and corresponding to the second opening.

8. The heat-dissipating module in accordance with claim 7, wherein the shape of the second heat-dissipating tube is the same as the shape of the first heat-dissipating tube.

9. An electronic apparatus, comprising:
a housing;
a heat-generating element located within the housing; and
a heat-dissipating module located within the housing, the heat-dissipating module including:
  a first heat-conducting plate thermally coupled to the heat-generating element;
  a first heat-dissipating tube having a first opening and a second opening opposite to the first opening, wherein the first heat-conducting plate is connected to the first heat-dissipating tube and located at an outside of the first heat-dissipating tube;
  a second heat-conducting plate, thermally coupled to the heat-generating element, wherein the second heat-conducting plate is connected to the first heat-conducting plate at an angle; and
  a fan located at the second heat-conducting plate and adjacent and corresponding to the first opening, wherein the fan is adapted to generate an air current flowing in the first heat-dissipating tube.

10. The electronic apparatus in accordance with claim 9, wherein the first heat-conducting plate is adapted to rotate around a rotation axis from a first position in which the heat-conducting plate within the housing covers the heat-generating element to a second position outside the housing.

11. The electronic apparatus in accordance with claim 10, wherein the rotation axis passed through the first opening and the second opening.

12. The electronic apparatus in accordance with claim 9, wherein the second heat-conducting plate has a fifth opening by which the fan passes through and is fixed within the housing, and the first heat-conducting tube is adapted to rotate relatively to the fan.

13. The electronic apparatus in accordance with claim 12, wherein the fan passes through the second heat-conducting plate by the fifth opening of the second heat-conducting plate and is fixed to the second heat-conducting plate with two fixing members, the fixing members are located on different sides of the fan and are slidingly disposed in two arc-shaped rails of the housing, respectively, and the first heat-dissipating tube and the fan are adapted to rotate relatively to the housing.

14. The electronic apparatus in accordance with claim 9, wherein the first heat-dissipating tube is reel-shaped.

15. The electronic apparatus in accordance with claim 9, wherein the first heat-dissipating tube includes an uneven tube wall.

16. The electronic apparatus in accordance with claim 9, wherein the first heat-dissipating tube includes a tube wall and a plurality of heat-dissipating fins disposed on the tube wall and located within the first heat-dissipating tube.

17. The electronic apparatus in accordance with claim 9, wherein the heat-dissipating module further includes a second heat-dissipating tube having a third opening and a fourth opening opposite to the third opening, the first heat-conducting plate is connected to the second heat-dissipating tube and located at an outside of the second heat-dissipating tube, and the third opening is located adjacent to the second opening and corresponding to the second opening.

18. The electronic apparatus in accordance with claim 17, wherein the shape of the second heat-dissipating tube is the same as the shape of the first heat-dissipating tube.

* * * * *